J. M. BUTCHER.
MOUNTING AND CONTROL FOR ALARMS.
APPLICATION FILED OCT. 11, 1918.
1,410,161. Patented Mar. 21, 1922.
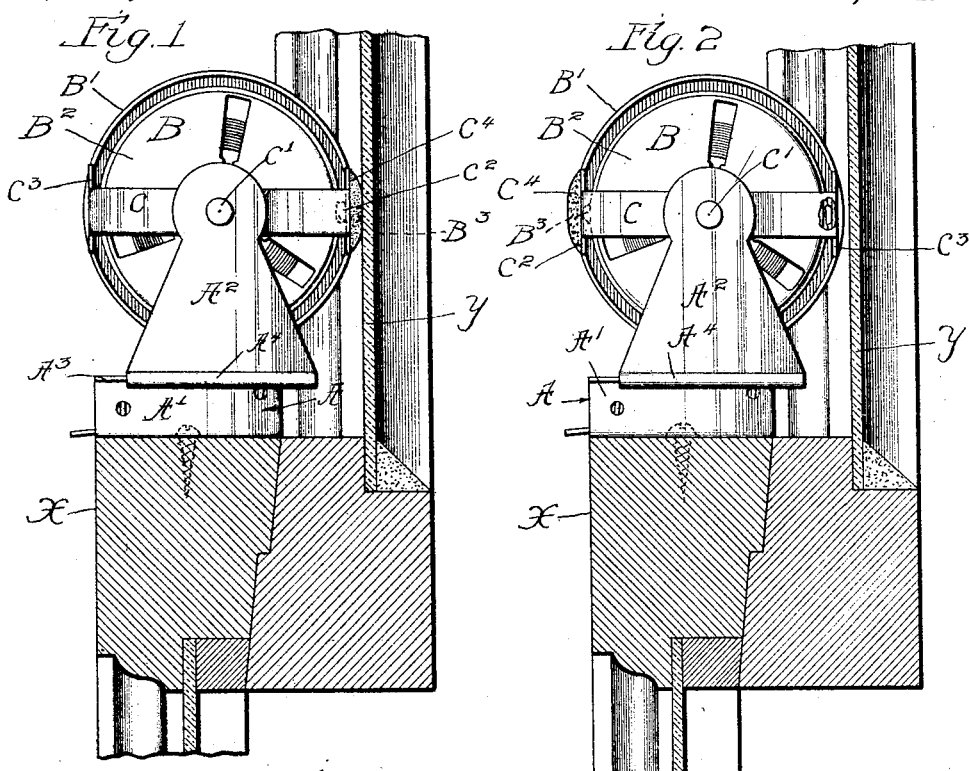
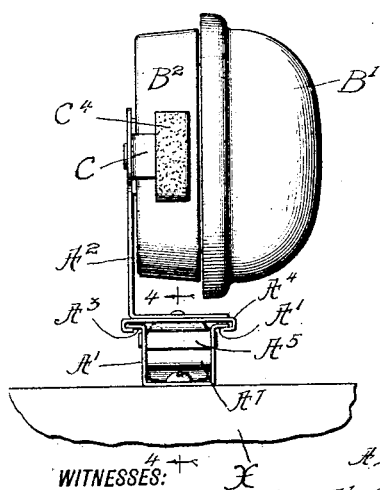
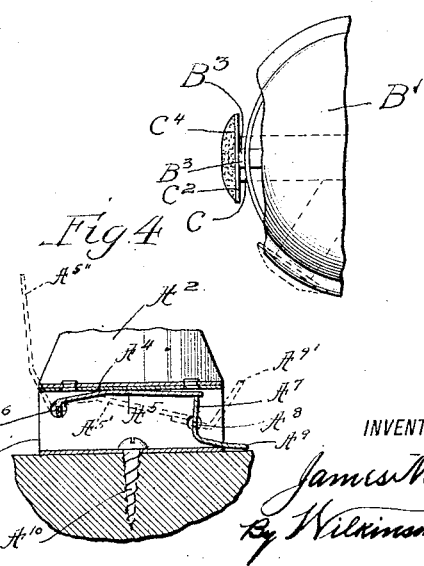
WITNESSES:
Harry S. Gather
INVENTOR
James M. Butcher
By Wilkinson & Huxley
ATTORNEYS.

UNITED STATES PATENT OFFICE.

JAMES M. BUTCHER, OF CHICAGO, ILLINOIS, ASSIGNOR, BY MESNE ASSIGNMENTS, TO SENTINEL ALARM CO., OF CHICAGO, ILLINOIS, A CORPORATION OF ILLINOIS.

MOUNTING AND CONTROL FOR ALARMS.

1,410,161.  Specification of Letters Patent.  Patented Mar. 21, 1922.

Application filed October 11, 1918. Serial No. 257,751.

*To all whom it may concern:*

Be it known that I, JAMES M. BUTCHER, a citizen of the United States, residing at Chicago, in the county of Cook and State of Illinois, have invented certain new and useful Improvements in Mountings and Controls for Alarms, of which the following is a specification.

In my application, Serial No. 180,065, filed July 12, 1917, I have described and broadly claimed an alarm device adapted for mounting upon the one, and having a frictional releasing means for coacting with another of two structures between which there is relative movement, as, for instance, two relatively sliding sash of a window; the mounting for the alarm comprising an attaching support adapted to be secured, for instance, upon the meeting rail of the window in approximately correct position, and an alarm carrier sliding upon said support to and from the direction of impingement of the frictional releasing device against the other relatively movable member, for instance, the window pane; a locking device being also provided for fixing the carrier in any position to which it may be adjusted upon the support.

The present invention seeks to provide an improved construction of support adapted to serve the purposes of my previous invention aforesaid, together with a novel construction of frictional releasing device which serves the purpose of restraining the alarm both while leaving the releasing device subject to movement by the opening of the window, or, when adjusted to another position, restraining the alarm without leaving the alarm subject to release by the opening of the window, as, for instance, during a period when the protective function of the alarm is not required.

The invention will be more fully understood upon reference to the accompanying drawings, in which—

Figures 1, 2, and 3 are, respectively, the right side elevation, the left side elevation, and the front elevation of an alarm device containing one embodiment of the several features of the present invention.

Figs. 4 and 5 are detail views showing, respectively, the construction of the adjustable mounting, and the relation of the releasing device to the alarm stop.

A represents the mounting; B the alarm; and C the releasing device. The mounting comprises the attaching base $A^1$ and the carrier $A^2$, the former provided with a slide track $A^3$ and the latter with a slide shoe $A^4$ mounted thereon and engaged therewith in a manner to resist vertical or lateral displacement while permitting longitudinal sliding movement. The mounting further comprises a friction tongue $A^5$ pivoted at $A^6$ upon the attaching base $A^1$, and in position to develop frictional pressure against the underside of the shoe $A^4$ of the carrier $A^2$; also a presser-foot $A^7$ pivoted at $A^8$ upon the attaching base in position to force the friction tongue against the slide shoe and so retain the carrier in any position to which it may be adjusted upon the attaching base, said presser-foot having a controlling finger-piece $A^9$ at such angular position thereon as will arrest the presser-foot $A^7$ when it has swung upwardly slightly beyond its dead center position, and where it will be held by the pressure of the friction tongue $A^5$. The friction tongue is deflected intermediate of its length so that when forced into contact with the slide shoe it is put under tension. The parts may assume the positions indicated by $A^{5'}$, $A^{9'}$ to permit assembly of the mounting, or the friction tongue may be moved to the position $A^{5''}$ with the carrier removed from the attaching base in order to permit the screw $A^{10}$ to be introduced in mounting the attaching base upon the building structure to which the alarm is to be applied.

The alarm may be of any suitable construction, such, for instance, as one embodying a bell $B^1$, a shell $B^2$ containing actuating mechanism for the bell, and an alarm stop $B^3$ protruding from the alarm and operating in the well-known manner to arrest the alarm when forced inwardly and release the alarm when permitted to move outwardly.

The releasing device comprises an arm C, pivoted at $C^1$ and carrying projections $C^2$, $C^3$ at its respective ends, either of which, by the swinging of the arm C, may be brought into position to depress the alarm stop $B^3$. The projection $C^2$ is provided with a friction pad $C^4$, through which the arm C may rest in frictional contact with the surface relative to which the alarm moves in the opening of the closure to be protected, for instance, the glass or other surface of one of two window sash upon the rail of the other of which the alarm is mounted, and so that relative movement between the two sliding members, when the alarm is properly applied, will cause the arm C to swing upon its pivot $C^1$, and so release the stop $B^3$ and permit the alarm to sound.

The alarm is applied by attaching the base $A^1$, through the medium of the screw $A^{10}$, for instance, to the top rail X of a lower window sash in approximate position which will bring the friction pad $C^4$ against the window pane Y, for instance, the base $A^1$ being positioned so that its track $A^3$ will be directed toward the surface with which the releasing pad $C^4$ is to contact. The carrier $A^2$, with the alarm mounted thereon, is then applied to the track $A^3$ and slid forward until proper frictional contact is developed between the pad $C^4$ and the surface, when the finger-piece $A^9$ is depressed to secure the parts in position.

If it should be desired to leave the window free for opening and closing without actuating the alarm, it is not necessary to disturb the adjustment of the carrier $A^2$ upon its track $A^1$, but merely to swing the arm C to an arc of one hundred and eighty (180) degrees until the projection $C^3$ is brought into depressing relation to the stop $B^3$, when the alarm would be restrained without contacting the relatively moving surface Y; and for recalling the protective function of the alarm into service, it will simply be necessary to reverse the arm C until the projection $C^2$ is in restraining relation to the stop $B^3$, and the pad $C^4$ is against the relatively moving surface. Obviously, the conditions described above will prevail with the two window sash, or other relatively moving members of a building structure, set at any desired initial position, for instance, with the window partially open, and the alarm will become instantly effective upon any attempt to disturb such position.

I claim:

1. An alarm device having a releasing stop, a restraining member mounted upon the alarm device, movable thereon into either of two positions and constructed to engage the stop and restrain the alarm in both of said positions; said restraining member having means by which it is engaged and displaced by a relatively movable structure while in one of its stop-restraining positions.

2. An alarm device having a releasing stop, a restraining member for said stop having two stop-restraining arms and movable to bring either of said arms into restraining relation to said stop, one of said arms being provided with means through which to engage a relatively moving structure to withdraw it from the stop.

3. An alarm device having a releasing stop, and a restraining member for said stop comprising an intermediately pivoted bar having at its respective ends projections through which to restrain said stop, one of said projections also carrying a friction pad.

4. In an alarm device, the combination of a mounting comprising a carrier and an attaching base upon which the carrier is mounted for adjustment toward the surface with which the alarm is to coact, an alarm having a releasable stop which controls its action and presented thereon toward the surface with which the alarm is to coact, and a releasing device comprising an intermediately pivoted bar having its respective ends constructed to enter between the controlling stop and the surface with which the alarm is to coact, one of said ends being constructed with a friction pad whereby the releasing device is made to coact simultaneously with the stop and with said surface.

Signed at Chicago, Illinois, this 28th day of September, 1918.

JAMES M. BUTCHER.